A. Beswick, P. Richardson, Jr. & J. W. Brown,
Making Wagon Wheels.
№ 69,307. Patented Oct. 1, 1867.
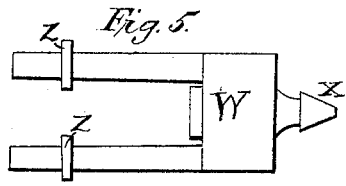
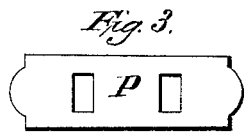
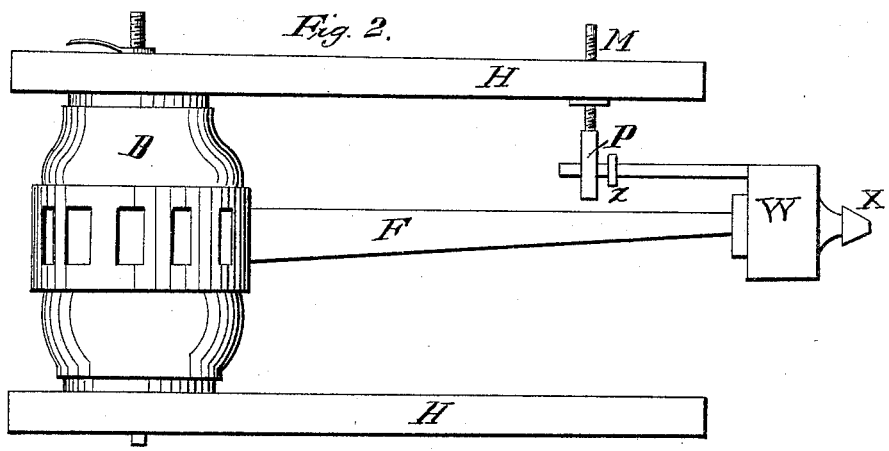
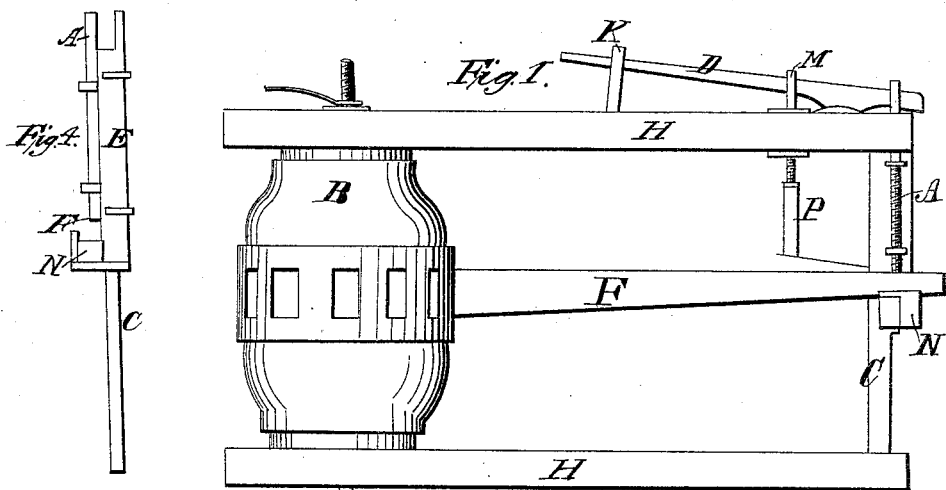
Attest:
Inventors:

United States Patent Office.

ALONZO BESWICK, PARIS RICHARDSON, JR., AND JOHN W. BROWN, OF KELLEY, ILLINOIS.

Letters Patent No. 69,307, dated October 1, 1867.

IMPROVEMENT IN MACHINES FOR MAKING WAGON-WHEELS.

*The Schedule referred to in these Letters Patent and making part of the same.*

TO ALL WHOM IT MAY CONCERN:

Be it known that we, ALONZO BESWICK, PARIS RICHARDSON, Jr., and JOHN W. BROWN, of the town of Kelley, Warren county, State of Illinois, have invented a new and useful Machine for Holding Spokes, for driving the same into the hub, also for guiding the auger for making the tenon on the end of the spoke to receive the felloe; and we do hereby declare that the following is a full, clear, and exact description of the construction and operation of the same, reference being had to the annexed drawing, making a part of this specification.

The nature of our invention consists in providing bars attached to the ends of the wagon-hub with a cross-bar or rest for the spokes at the ends of the bars opposite the hub, or at the outer end of the spoke, by means of which the spoke may be permanently held in any position desired, while the spoke is driven into the hub, and also by which the spoke-auger may be guided, so as to cut the tenons with a uniform depth and angle.

To enable others to make and use our invention, we will describe its construction and operation, by reference to the drawing and the letters marked thereon.

We first construct the guide-bars H H, in Figure 1, of any length required by the length of the spoke, which, when the machine is in operation, are attached to the ends of the hub. At the ends of the guide-bars H H, opposite the hub, we attach the cross-bar C, made of iron or steel, it being made movable at the lower end. We then attach to the upper part of the cross-bar C, by means of staples, the movable rest E, as shown in Figure 4, to the lower part of which is attached a foot-piece, to serve as a rest for the spoke, as shown by letter N in fig. 4. The foot-piece N is attached to the movable bar E by means of braces passing around and enclosing the cross-bar C, the cross-bar serving as a spindle for the movable bar and foot-piece to move upon as required. The movable bar E is worked and adjusted to a proper place by means of the lever D, attached to the top guide-bar H. To the upper guide-bar H we also attach a gauge-screw, A, shown in fig. 4, which may be set so as to give the spokes the dish required. When the spokes are set into the hub the cross-bar C, together with the movable bar E and screw A, may be removed, and the frame W, Figure 5, for holding the tenoning-auger, attached. The frame W is guided so that the tenons may be cut at any angle required, and cut to a uniform depth, by means of the gauges Z Z, which may be set to any depth desired. The auger is guided in direction by means of the screw M in top guide-bar H.

To operate the machine the bars H H are attached to the hub, with the other parts complete, as shown in fig. 1. The machine is made firm, by inserting between the outer ends of the guide-bars H H a brace of the same length as the hub, and then drawing the bars H H together by turning the screw T, fig. 1, until they become firm upon the brace. The spoke is then inserted into the hub, the small end resting in the foot-piece N. The spoke is then adjusted and placed at a proper angle with the hub, by means of the lever D, and there firmly held until driven into the hub.

What we claim as our invention, and desire to secure by Letters Patent, is—

The combination and arrangement of the cross-bar C and movable bar E with the guide-bars H H, operating in the manner and for the purposes set forth.

We also claim the auger-frame W, in combination with the screw M and guide-bar H, operating substantially as described and for the purposes stated.

ALONZO BESWICK,
PARIS RICHARDSON, JR.,
JOHN W. BROWN.

Witnesses:
H. L. LESHER,
O. E. BESWICK.